No. 606,662. Patented July 5, 1898.
J. C. HENDERSON.
PIPE JOINT PACKING.
(Application filed Aug. 4, 1897.)

(No Model.)

Witnesses:
E. B. Bolton
C. S. Rogers

Inventor:
John C. Henderson
By James R. Rogers
his Attorneys.

UNITED STATES PATENT OFFICE.

JOHN C. HENDERSON, OF NEW YORK, N. Y.

PIPE-JOINT PACKING.

SPECIFICATION forming part of Letters Patent No. 606,662, dated July 5, 1898.

Application filed August 4, 1897. Serial No. 647,123. (No model.)

*To all whom it may concern:*

Be it known that I, JOHN C. HENDERSON, a citizen of the United States, residing at New York, in the county of New York and State of New York, have invented certain new and useful Improvements in Pipe-Joint Packing; and I do hereby declare the following to be a full, clear, and exact description of the invention, such as will enable others skilled in the art to which it appertains to make and use the same.

This invention relates to pipe or rod packing, and particularly to that class wherein a fixed pipe, rod, or joint is employed and which is adapted to be affected by varying temperature, thus rendering a metallic packing useless; and in this connection I employ a threaded joint, such as a pipe-joint, into a casting, forging, or any pipe-fitting having a packing-chamber extending thereinto a partial distance and provided with a beveled bottom upon which is seated an elastic ring, preferably frusto-conical in cross-section, and upon the frusto-conical ring rests a loose metallic follower or packing-ring beveled on its under side or face to register or correspond with the bevel on the frusto-conical ring, and secured within the upper portion of the packing-chamber by a screw-threaded or other suitable connection is a packing-nut or straight gland adapted to be screwed down upon the follower, and thereby force the frusto-conical ring into the screw-threads on the pipe or rod and fill it up to the bottom of the thread on the pipe or rod.

With these and other objects in view the invention consists in the construction, combination, and arrangement of parts hereinafter more fully described in the specification and illustrated in the accompanying drawings, in which—

Figure 1:
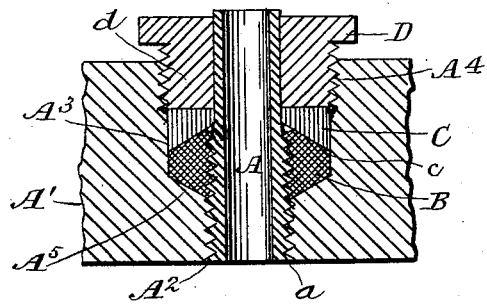
Figure 2:
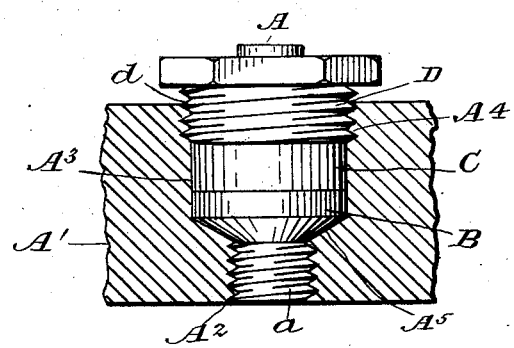

Figure 1 is a longitudinal section through the several parts; and Fig. 2 is a similar section, parts being shown in elevation.

Similar characters of reference designate like parts throughout both views.

Referring to the drawings, the reference-letter $A'$ designates a portion of a casting, forging, or any suitable article provided with a screw-threaded opening $A^2$, the upper portion of which is enlarged or flared to form a packing-chamber $A^3$, having an inclined or beveled bottom $A^5$, and the upper portion of this chamber is provided with screw-threads $A^4$, and into the opening $A^2$ is inserted or secured a pipe or rod $A$, provided with exterior screw-threads $a$, extending a portion of the length thereof, and the screw-threaded end of the pipe or rod $A$ is adapted to be secured within the screw-threaded opening $A^2$, as is clearly shown in the drawings.

Upon the beveled bottom $A^5$ of the packing-chamber $A^3$ and around the pipe or rod $A$ is secured a frusto-conical ring $B$, of rubber or any other suitable material possessing the necessary qualities required, and above this ring $B$ is a metallic or other suitable ring or follower $C$, the under side or face of which is inclined or beveled, as shown at $c$ in Fig. 1, and both the bevel of the bottom $A^5$ of the packing-chamber $A^3$ and the bevel of the under side or face $c$ of the follower register or correspond with the beveled sides of the frusto-conical ring $B$—that is to say, all of these bevels have the same inclination or pitch.

Removably secured within the upper screw-threaded portion $A^4$ of the packing-chamber $A^3$ is a tubular packing-nut $D$ or similar device provided with a depending exteriorly-screw-threaded portion $d$, by means of which the nut is retained in position by engagement with the interior screw-threads $A^4$, as stated, and by means of this construction the packing-nut may be rotated and the follower $C$ will be forced against the elastic frusto-conical ring $B$, which will be pressed into the screw-threads upon the pipe or rod $A$, thereby preventing the leaking or escape of the gas or other medium employed along the bottom of the pipe or rod threads in very high pressure.

The exterior screw-threads $a$ upon the pipe or rod $A$ are extended approximately to the top of the frusto-conical ring $B$, and by means of the ring $B$ the change of temperature of the parts or of the medium employed will not affect the efficiency of this invention.

Having fully described my invention, what I claim as new, and desire to secure by Letters Patent, is—

A pipe-joint packing consisting of a casting or forging provided with an enlarged opening having a screw-threaded orifice, the bottom of said opening sloping or converging to a central screw-threaded bore, a screw-threaded pipe or rod secured in said bore, a frusto-conical elastic ring around the screw-threaded portion of said pipe or rod and resting upon said sloping or converging bottom said screw-threaded portion of the pipe or rod extending the entire length of the packing-ring, a follower above said ring having a beveled under surface corresponding to the bevel of said ring and a packing-nut about said pipe or rod and having only connection with the screw-threaded walls of said orifice.

In testimony whereof I affix my signature in presence of two witnesses.

JOHN C. HENDERSON.

Witnesses:
C. S. ROGERS,
D. C. KELSEY.